(12) United States Patent
Hinks et al.

(10) Patent No.: US 11,001,961 B2
(45) Date of Patent: May 11, 2021

(54) OXIDATIVE METHOD FOR DECOLORIZING TEXTILE MATERIALS

(71) Applicant: NORTH CAROLINA STATE UNIVERSITY, Raleigh, NC (US)

(72) Inventors: David Hinks, Apex, NC (US); Maqbool Hussain, Chattanooga, TN (US); Guan Wang, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 45 days.

(21) Appl. No.: 15/900,513

(22) Filed: Feb. 20, 2018

(65) Prior Publication Data

US 2018/0171539 A1   Jun. 21, 2018

Related U.S. Application Data

(63) Continuation of application No. PCT/US2016/047303, filed on Aug. 17, 2016.

(60) Provisional application No. 62/208,161, filed on Aug. 21, 2015.

(51) Int. Cl.
| | |
|---|---|
| *D06L 4/12* | (2017.01) |
| *C08J 11/00* | (2006.01) |
| *C11D 3/39* | (2006.01) |
| *C08J 11/04* | (2006.01) |
| *D06P 5/13* | (2006.01) |

(52) U.S. Cl.
CPC ............ *D06L 4/12* (2017.01); *C08J 11/00* (2013.01); *C08J 11/04* (2013.01); *C11D 3/39* (2013.01); *D06P 5/132* (2013.01)

(58) Field of Classification Search
CPC ... D06L 4/12; C08J 11/04; C08J 11/00; D06P 5/132; C11D 3/39
See application file for complete search history.

(56) References Cited

U.S. PATENT DOCUMENTS

| | | | | |
|---|---|---|---|---|
| 3,423,481 | A | * | 1/1969 | Mizutani ................ C08L 23/02 525/176 |
| 4,003,881 | A | * | 1/1977 | Sidebotham ............ C08J 11/08 528/487 |
| 5,613,983 | A | | 3/1997 | Terry et al. |
| 5,711,764 | A | | 1/1998 | Wasinger |
| 5,989,296 | A | | 11/1999 | Patton et al. |
| 6,120,554 | A | | 9/2000 | Patton et al. |
| 6,217,621 | B1 | | 4/2001 | Modebelu et al. |
| 7,192,988 | B2 | | 3/2007 | Smith et al. |
| 7,959,807 | B2 | | 6/2011 | Mukai et al. |
| 2005/0028291 | A1 | | 2/2005 | Bechtold et al. |
| 2005/0115004 | A1 | | 6/2005 | Tashiro et al. |
| 2006/0230541 | A1 | | 10/2006 | Hirsch et al. |
| 2008/0255259 | A1 | | 10/2008 | Ozer et al. |
| 2010/0281623 | A1 | | 11/2010 | Oshel et al. |
| 2012/0125844 | A1 | | 5/2012 | Dongare et al. |
| 2014/0072653 | A1 | * | 3/2014 | Buschmann ........... A01N 37/16 424/613 |
| 2014/0088210 | A1 | * | 3/2014 | Yorde ..................... C08J 11/04 521/48 |
| 2015/0059103 | A1 | | 3/2015 | Liu et al. |

FOREIGN PATENT DOCUMENTS

| | | |
|---|---|---|
| CN | 101215776 A | 7/2008 |
| CN | 101967761 A | 2/2011 |
| CN | 103396583 A1 | 11/2013 |
| WO | 2014-047620 A1 | 3/2014 |
| WO | 2014047620 A1 | 3/2014 |

OTHER PUBLICATIONS

International Search Report, PCT/US2016/052593, dated Jan. 5, 2017.
International Search Report, PCT/US2016/047303, dated Nov. 21, 2016.
Szpyrkowicz, L. et al.; "A Comparative Study on Oxidation of Disperse Dyes by Electrochemical Process, Ozone, Hypochlorite and Fenton Reagent", Water Research 2001, vol. 35, No. 9, pp. 2129-2136.
Neamtu, M. et al.; "Decolorization of disperse red 354 azo dye in water by several oxidation processes—a comparative study", Dyes and Pigments 60 (2004) 61-68.
Arslan, I; "Treatability of a simulated disperse dye-bath by ferrous iron coagulation, ozonation, and ferrous iron-catalyzed ozonation", Journal of Hazardous Materials B85 (2001) 229-241.
Yang, Y.Q. et al.; "Decolorizartion of dyes using UV/H2O2 photochemical oxidation", Textile Chemist and Colorist (1998) vol. 30, 4, 27-35.
Kim, Tak-Hyun et al.; "Comparison of disperse and reactive dye removals by chemical coagulation and Fenton oxidation", Journal of Hazardous Materials B112 (2004) 95-103. Hsing, Hao-Jan et al.; "The decolorization and mineralization of Acid Orange 6 azo dye in aqueous solution by advanced oxidation processes: a comparative study", Journal of Hazardous Materials 141 (2007) 8-16.
Surpateanu, M.; et al.; "Advanced oxidation processes for decolorization of aqueous solution containing Acid Red G azo dye", Central European Journal of Chemistry 2(4) (2004), 573-588.
Salazar, R. et al.; "Finding the best Fe2+/Cu2+ combination for the solar photoelectro-Fenton treatment of simulated wastewater containing the industrial textile dye Disperse Blue 3", Applied Catalysis B: Environmental 115-116 (2012) 107-116.
He, Y. et al.; "Fenton oxidation of 2,4- and 2,6-dinitrotoluene and acetone inhibition", Frontiers of Environmental Science & Engineering in China, Sep. 2008, vol. 2, Issue 3, pp. 326-332.

(Continued)

*Primary Examiner* — Amina S Khan
(74) *Attorney, Agent, or Firm* — Womble Bond Dickinson (US) LLP

(57) ABSTRACT

The disclosure relates to a method for decolorization of a dye-colored synthetic polymer, which includes the steps of treating a dye-colored synthetic polymer, such as polyester, with a treatment composition at pH 4 or less, the treatment composition comprising hydrogen peroxide, an iron catalyst, water, and a ketone. The resulting decolorized synthetic polymer is then separated from the treatment composition.

7 Claims, No Drawings

(56) References Cited

OTHER PUBLICATIONS

Ciner, F. et al.; "Treatability of Dye Solutions Containing Disperse Dyes by Fenton and Fenton-Solar Light Oxidation Processes", Clean Soil Air Water 2013, 41(1), 80-86.
Kumar, D.; "Use of Photo-Fenton Reagent for the Degradation of Thioglycolic Acid", International Journal of Analytical, Pharmaceutical and Biomedical Sciences, 2014, 3(3), 1-5.
Barbusinski, K.; "Fenton Reaction—Controversy Concerning the Chemistry", Ecological Chemistry and Engineering, 2009, 16, 3, 347-358.
Bigda, R.; "Fenton's Chemistry: an Effective Advanced Oxidation Process", environmental Technology May-Jun. 1996, 35-39.
Prato-Garcia, D. et al.; "Degradation of azo dye mixtures through sequential hybrid systems: Evaluation of three advanced oxidation processes for the pre-treatment stage", Journal of Photochemistry & Photobiology, a: Chemistry (2011), 223 (2), 103-110.
De Amorim, C. et al.; "Comparison of various advanced oxidation processes for azo dye degradation", Engenharia Sanitaria E Ambiental, Oct.-Dec. 2009, 14, 4, 543-550.
Chu, W., Tsui, S.M. "Photosensitization of Diazo Disperse Dye in Aqueous Acetone," Chemosphere 1999, 39(10), 1667-1677.
Chu, Wei et al.; "Photo-sensitization of diazo disperse dye in aqueous acetone", Chemosphere, vol. 39, No. 10, pp. 1667-1677, 1999.
Prola, Lizie D.T. et al.; "Comparison of Jatropha curcas shells in natural form and treated by non-thermal plasma as biosorbents for removal of reactive Red 120 textile dye from aqueous solution", Industrial Crops and Products, vol. 46, pp. 328-340, 2013.
Khadhraoui, M. et al.; "Discoloration and detoxicification of a Congo red dye solution by means of ozone treatment for a possible water reuse", Journal of Hazardous Materials, vol. 161, pp. 974-981, 2009.

\* cited by examiner

OXIDATIVE METHOD FOR DECOLORIZING TEXTILE MATERIALS

CROSS-REFERENCE TO RELATED APPLICATIONS

This application is a continuation of International Application No. PCT/US2016/047303, filed Aug. 17, 2016, which International Application was published by the International Bureau in English on Mar. 2, 2017, and claims priority to U.S. Provisional Application No. 62/208,161, filed on Aug. 21, 2015, which are incorporated herein by reference in their entirety and for all purposes.

FIELD OF THE INVENTION

The present disclosure relates to methods for decolorization of dye-colored synthetic polymer materials, particularly polyester-containing textiles.

BACKGROUND OF THE INVENTION

In our increasingly waste-conscious world, tremendous strides have been made with respect to recycling synthetic materials. Significant progress has been made, in particular, in the area of polyester products, such as polyethylene terephthalate (PET) products. Total global tonnage of such products is in the tens of millions, primarily in the form of textiles and packaging (e.g., PET bottles). Recycling and reuse of the polymer material in PET bottles has become particularly widespread, and such recycling processes typically include mechanical processing techniques that produce polymer chips that can be used as a feedstock in a variety of polyester product manufacturing processes including those used to make textiles.

However, use of recycling techniques for synthetic fiber products such as textiles has not reached the same level of widespread acceptance. One problem associated with synthetic fiber recycling is the fact that virtually all synthetic fibers are colored as part of the manufacturing process. Although many thermoplastic fibers can be melted and either extruded or injection molded into new products, the presence of colorant in the polymer material reduces the commercial attractiveness of many synthetic textile materials otherwise available for recycle and reuse.

Certain recycling processes have been proposed for polyester materials that includes dye removal steps. See, for example, U.S. Pat. No. 7,192,988 to Smith et al. and U.S. Pat. No. 7,959,807 to Mukai et al. However, both of the above-noted patents also suggest depolymerization and repolymerization steps, which greatly increase the cost and complexity of those processes.

DETAILED DESCRIPTION

As stated above, previous efforts to recycle dye-colored polymers required depolymerization and repolymerization steps, which greatly increase the cost and complexity of those processes. There remains a need in the art for a method for decolorizing polymer materials which does not require destroying or significantly degrading the structure of the polymer.

Although considerable research has focused on removal of colorants from wastewater streams such as those associated with textile plants, relatively little research has been conducted on selectively removing colorant from polymer materials, which presents challenges not present in wastewater treatment. Processes used for wastewater treatment are generally intended to, and are effective in, breaking down or removing many more compounds from water than just colorants. While the general removal or break-down of organic compounds is appropriate and desirable for the purposes of wastewater cleanup, these processes often are not sufficiently efficient in selectively removing colorants and can result in the removal or break-down of the synthetic polymers themselves. In batch processes which employ reagents at pre-determined concentrations for controlled periods of time, these processes can remove or destroy any reagents along with colorants.

The present disclosure provides a method of decolorizing synthetic polymer materials such as synthetic polymer-containing textiles without causing significant degradation of the structure of the polymers. The method is particularly well-suited for polyester-containing textiles, although the method can be applied to textiles containing other synthetic polymers. The method involves treating the synthetic polymer with a Fenton's reagent, i.e., an aqueous solution of hydrogen peroxide combined with an iron catalyst. Fenton's reagents have been used to break down organic compounds in wastewater. It has been found that Fenton's reagent can be effective in decolorizing dye-colored polymeric materials. Unexpectedly, when treating dye-colored synthetic polymers, it has been found that the addition of a ketone such as acetone to the treatment increases the efficacy of the decolorizing treatment such that significant decolorization of synthetic polymers occurs over reasonable time periods and under conditions which are amenable to manufacturing. The addition of the ketone to the treatment has not been found to significantly degrade synthetic polymers during the treatment. In fact, it has been found that it is possible to use this treatment to decolorize textiles formed from synthetic polymers, and that the decolorized textiles can then be recycled, for example by re-using and re-dying the polymers.

It is surprising that combining a ketone with a Fenton's reagent under these conditions has this effect. As Fenton's reagent is commonly used to break down organic compounds, it was expected that the Fenton's reagent would break down the ketone along with the colorants, and/or that the presence of the ketone would have inhibited the effectiveness of the Fenton's reagent. However, the opposite has been found to occur: addition of the ketone to the Fenton's reagent in the disclosed treatment increases, rather than inhibits, the effectiveness of the treatment in breaking down colorants. Additionally, this combined treatment has been found to have little if any detrimental effect on the structure of the synthetic polymer. Without being bound by theory, it is believed that the presence of the ketone may at least partially dissolve the dye, and/or may at least partially swell the polymer material so that the dye is more easily extracted from the polymer. Alternatively or in addition, this dissolution and/or swelling may allow better contact between the components of the Fenton's reagent and the dye, thus increasing the effectiveness of the decolorizing treatment.

The method for decolorizing a dye-colored synthetic polymer comprises treating a dye-colored synthetic polymer with a treatment composition, the treatment composition comprising (a) hydrogen peroxide, (b) an iron-containing catalyst, (c) water, and (d) a ketone dissolved in the treatment composition; wherein the treatment composition has a pH of 4 or less, and the treating is carried out at a temperature of at least 50° C. and for a duration of time sufficient to at least partially decolorize the synthetic polymer; and following the treating, separating at least partially decolorized synthetic polymer from the treatment composition. In one example, the treatment composition comprises from 0.1M to 0.8M of the hydrogen peroxide. In another example, the treatment composition comprises from 0.36 mM to 0.01 M of the iron-containing catalyst. In yet another example, a weight ratio of the hydrogen peroxide to the iron-containing catalyst present in the treatment composition is at least 100:1.

The iron-containing catalyst can comprises an iron salt which at least partially dissolves in the treatment composition, thereby providing iron (II) ions or iron (III) ions to the treatment composition. In one example, the iron-containing catalyst comprises iron (II) sulfate. In another example, the iron-containing catalyst consists essentially of iron (II) sulfate.

The ketone of the treatment composition can comprises a ketone selected from the group consisting of acetone, methyl ethyl ketone, 2-pentanone, 3-pentanone, 2-hexanone, 3-hexanone, methyl isobutyl ketone, methyl n-propyl ketone, methyl isopropyl ketone, ethyl ketone, and any combination thereof. In one example, the ketone of the treatment composition comprises acetone. In another example, the ketone of the treatment composition consists essentially of acetone.

In one example, a weight ratio of the water to the ketone in the treatment composition is from 4:1 to 1:4. In another example, the weight ratio of the water to the ketone is from 2:1 to 1:2.

The treatment composition can be held at a constant temperature during the treating step, or can be varied over the course of the treating step. The temperature of the treatment composition can be at least 70° C. The temperature of the treating composition during the treating step can be from 50° C. to 140° C. The temperature of the treating composition during the treating step can be from 70° C. to 120° C. The temperature of the treating composition during the treating step can be from 80° C. to 110° C. The temperature of the treating composition during the treating step can be about 100° C.

During the treating step, the liquor ratio present, i.e., the ratio of the weight of the treatment composition to the weight of the textile being treated, can be at least 10:1. In one example, the liquor ratio present during the treating step is at least 20:1.

The dye-colored synthetic polymer can be colored with a dye selected from the group consisting of acid dyes, basic dyes, mordant dyes, direct dyes, sulfur dyes, disperse dyes, reactive dyes, and vat dyes.

The dye-colored synthetic polymer can be colored with a dye selected from the group consisting of acridine dyes, anthraquinone dyes, arylmethane dyes, azo dyes, cyanine dyes, nitro dyes, nitroso dyes, phthalocyanine dyes, quinone dyes, thiazine dyes, thiazole dyes, xanthene dyes, fluorene dyes, stilbene dyes, vinyl sulfone dyes, triazine dyes, sulfur dyes, indigoid dyes, and any combination thereof. In one example, the dye-colored synthetic polymer is colored with a cationic dye. In a particular example of the method, the dye-colored synthetic polymer is colored with an azo dye, an anthraquinone dye, or any combination thereof.

The synthetic polymer can comprise a polymer selected from the group consisting of regenerated celluloses, polyesters, polyamides, polyurethanes, polyolefins, acrylonitriles, and any combination thereof. In one example, the synthetic polymer comprises polyethylene terephthalate (PET). In another example, the synthetic polymer consists essentially of polyethylene terephthalate (PET).

The dye-colored synthetic polymer can be present in the form of a dye-colored synthetic polymer-containing textile.

The textile can be a woven textile, a knit textile, a braided textile, or a non-woven textile.

The effectiveness of the present decolorization method can be determined using various quantitative methods known to those of skill in the art. In one example, wherein the dye-colored synthetic polymer comprises a dye-colored synthetic polymer textile, following the treating, the at least partially decolorized textile material has a K/S value of less than 3, as determined using equation (i):

$$K/S = \frac{(1-R)^2}{2R} \qquad (i)$$

wherein R=1.0 at 100% reflectance.

In another example, following the treating, the at least partially decolorized synthetic polymer textile has a K/S value as determined using equation (i) which is at least 70% lower than the K/S value of the dye-colored synthetic polymer textile prior to the treating.

The degree of degradation caused to the synthetic polymer by the treatment can be evaluated using various quantitative methods known to those of skill in the art. In one example, a difference between an intrinsic viscosity of the synthetic polymer before and after the treating is less than plus or minus 5%. In another example, a difference between the viscosity average molecular weight of the synthetic polymer before and after the treatment is less than plus or minus 2%. In yet another example, a difference between the viscosity average molecular weight of the synthetic polymer before and after the treatment is less than plus or minus 1%.

The method can further comprise a step of presoaking the dye-colored synthetic polymer prior to the treating, wherein the pre-soak composition comprises an aqueous solution of an organic solvent. In one example, the organic solvent of the pre-soak composition comprises a ketone. In another example, the organic solvent of the pre-soak composition comprises the same ketone as the treatment composition. In yet another example, the organic solvent of the pre-soak composition comprises acetone. In a particular example, the organic solvent of the pre-soak solution consists essentially of acetone. The pre-soak composition can be effective to at least partially swell the dye-colored synthetic polymer.

The method for decolorizing a dye-colored synthetic polymer can be a method for decolorizing a dye-colored polyethylene terephthalate-containing textile, comprising the steps of optionally pre-soaking a dye-colored polyethylene terephthalate-containing textile in a presoak composition comprising water and acetone; treating the dye-colored textile with a treatment composition, the treatment composition comprising (a) from 0.1M to 0.8M hydrogen peroxide, (b) 0.36 mM to 0.01 M of iron (II) ions, (c) water, and (d) acetone; wherein the treatment composition has a pH of 3 or less, and the treating is carried out at a temperature of at least 70° C. and for a duration of time sufficient to at least partially decolorize the dye-colored textile; and following the treating, separating at least partially decolorized textile from the treatment composition.

These and other features, aspects, and advantages of the disclosure will be apparent from a reading of the following detailed description. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural variations unless the context clearly dictates otherwise.

The present disclosure provides a method for decolorization of a dye-colored synthetic polymer without requiring depolymerization of its polymeric structure. The process is particularly advantageous for treating textile materials intended to be recycled as removal or diminution of colorant within the textile material can increase the value of the recycled material. The method generally includes the step of treating a dye-colored synthetic polymer with a solution comprising (a) hydrogen peroxide, (b) an iron-containing catalyst, (c) water, and (d) a ketone dissolved in the treatment composition; wherein the treatment composition has a pH of 3 or less.

The dye-colored synthetic polymer to be treated can be colored with various types of dyes. Exemplary types of dyes include acid dyes, basic dyes, mordant dyes, direct dyes, sulfur dyes, disperse dyes, reactive dyes, and vat dyes. Dyes can also be characterized by the chemical structure of the chromophore or reactive portion of the dye molecule, with examples including acridine, anthraquinone, arylmethane (including di- and triarylmethane), azo (including monoazo, diazo and triazo dyes), cyanine, nitro, nitroso, phthalocyanine, quinone (e.g., azin, indamin, indophenol, oxazin, oxazone), thiazine, thiazole, xanthene, fluorene, stilbene, vinyl sulfone, triazine, sulfur, and indigoid. Synthetic polymers such as polyester material colored with reactive dyes, basic dyes, acid dyes, or disperse dyes are particularly well-suited for use with the present method, including materials dyed with azo, nitro, quinoline, or anthraquinone dyes.

As previously discussed, the treatment composition of the present method includes Fenton's reagent. Fenton's reagent refers to a combination of hydrogen peroxide with an iron catalyst. The iron catalyst can comprise an iron salt capable of releasing iron ions (e.g., iron (II) ions alone or in combination with iron (III) ions) in solution. Exemplary iron salts include iron (II) sulfate and iron acetate. Fenton's reagent produces free radicals (e.g., hydroxyl radicals) capable of oxidizing organic compounds. For Fenton's reagent, mechanisms of reaction are shown in Equation 1 and 2 below.

$$Fe^{2+}+H_2O_2 \rightarrow Fe^{3+}+{}^-OH+H_2O \quad (1)$$

$$Fe^{3+}+H_2O_2 \rightarrow Fe^{2+}+HOO^-+H^+ \quad (2)$$

The overall amount hydrogen peroxide and iron catalyst will vary depending on the type of dye to be decolorized, the amount of dye present in the dye-colored synthetic polymer, the desired level of decolorization, and the material to be treated. The concentration of the iron catalyst can be at least 0.05 g/L, such as at least 0.1 g/L, or at least 0.5 g/L. A typical range of iron salt concentration is from 0.05 g/L to 5 g/L.

The concentration of hydrogen peroxide is typically at least 5 g/L, or at least 10 g/L or at least 15 g/L. A typical range is 5 g/L to 40 g/L (e.g., from 15 g/L to 30 g/L). Hydrogen peroxide is typically available as a dilute solution. The concentration of hydrogen peroxide, in the form of a 35% w/w solution, is typically at least 10 g/L, or at least 20 g/L or at least 30 g/L. A typical range for such a 35% w/w solution of hydrogen peroxide is from 10 g/L to 90 g/L (e.g., from 40 g/L to 80 g/L).

The amount of Fenton's reagent to be used in the treatment composition can also be characterized as a weight ratio of hydrogen peroxide to iron catalyst. The hydrogen peroxide is typically present in much higher amounts than the iron catalyst. For example, the weight ratio of hydrogen peroxide to iron catalyst is typically at least 2:1, at least 10:1, or at least 50:1. In some examples, the weight ratio is at least 100:1 or at least 200:1 hydrogen peroxide to iron catalyst. An exemplary range is from 2:1 to t 300:1 (e.g., from 50:1 to 250:1).

In accordance with the present method, the presence of both water and a ketone which is soluble in the treatment composition is important for significant decolorization of the synthetic polymer. It has been found that the use of treatment compositions without the ketone do not significantly reduce coloration in certain synthetic polymer materials under the general conditions discussed herein. Although not bound by any particular theory of operation, it is believed that the presence of the ketone enhances decolorization by dissolving at least a portion of the dye and/or swelling at least a portion of the synthetic polymer and, thus, bringing some portion of the dye material into better contact with the treatment composition. In other words, the ketone may cause release of at least a portion of the dye from the fibrous mass of the textile and/or may cause swelling of at least some of the fibers of the textile so that the treatment composition has better access to the dye molecule.

Although acetone is a particularly advantageous choice, other ketones or combinations of ketones could also be used in certain embodiments. Examples of other ketones include methyl ethyl ketone, 2-pentanone, 3-pentanone, 2-hexanone, 3-hexanone, methyl isobutyl ketone, methyl n-propyl ketone, methyl isopropyl ketone, ethyl ketone, and combinations thereof. The selection of ketone will depend, in part, on the type of synthetic polymer and the chemical nature of the dye to be removed therefrom. Considerations for ketone selection include the stability/inertness of the solvent in the presence of the Fenton's reagent and the level of solubility of the dye in the ketone.

The relative amounts of the water to the ketone can vary and will depend, in part, on the level of decolorization required, the type of synthetic polymer to be decolorized, and the type and structure of the dye. The weight ratio of the water to the ketone can be from 4:1 to 1:4, such as from 2:1 to 1:2 (e.g., about 1:1). The ketone will typically be present in an amount of at least about 10% by total weight of the water and ketone portion of the treatment composition, more typically at least 20% or at least 30% or at least 40% of the total weight of water and ketone in the treatment composition.

The treatment method involves contacting the dye-colored synthetic polymer to be treated with the treatment composition under conditions sufficient to cause decolorization to occur. The treatment process will typically entail combining the dye-colored synthetic polymer with the treatment composition in a suitable vessel, optionally equipped for stirring or agitation during the treatment process. The vessel is also advantageously equipped to heat the synthetic polymer and treatment composition during the treatment period.

Parameters of the treatment process such as time, pH, temperature, pressure, and liquor ratio can vary and will depend, in part, on the exact composition of the treatment composition, the desired level of decolorization, other treatment parameters (e.g., the time and temperature of the treatment process can vary inversely), and the type of synthetic polymer and dye to be treated. The time during which the synthetic polymer is exposed to the treatment composition will typically be at least 5 minutes, or at least 10 minutes, or at least 20 minutes. Significant decolorization is typically accomplished with treatment times of no more than about 120 minutes, such as no more than 90 minutes, or no more than 60 minutes. An exemplary treatment range is from 15 minutes to 75 minutes.

The treatment temperature will typically range from room temperature to about 150° C., with an advantageous range of from 60° C. to 120° C. In certain embodiments, elevated temperatures, such as a temperature of at least 100° C. or at least 110° C., provide the best decolorization results. The treatment process is typically conducted at atmospheric pressure, although higher pressures could be used with the present method.

The pH of the treatment composition is typically in the acidic range, with an exemplary pH range of about 1 to about 4 (e.g., from 2 to 4). The pH is typically below about 4, or below about 3.5.

The liquor ratio (L.R.) during treatment, which is defined as the ratio of the weight of the treatment composition to the weight of the textile being treated, is typically at least 5:1, or at least 10:1, or at least 20:1. In certain embodiments, the liquor ratio is from 5:1 to 60:1 (e.g., from 10:1 to 50:1).

Although the treatment process can be accomplished by treating the synthetic polymer (e.g., textile material) with the treatment composition in a single step, it can be advantageous to presoak the synthetic polymer in a pre-soak composition of an aqueous solution of an organic solvent (e.g., water and a lower alcohol or water and acetone) for a period of time prior to treatment with the treatment composition. Although not bound by any particular theory of operation, it is believed that pre-treatment of the synthetic polymer with the pre-soak composition may allow dissolution of a larger percentage of the dye and/or greater swelling of the synthetic polymer, which can enhance the effectiveness of decolorizing treatment. The pre-soaking step can be accomplished over a variable time period, but typically pre-soaking occurs for at least 5 minutes, or at least 10 minutes, or at least 15 minutes. Note that the temperature of the pre-soaking step can be lower than the treatment temperature. For example, pre-soaking can occur at room temperature or a temperature no higher than about 60° C., whereas the decolorizing treatment can be higher, such as greater than 100° C. as noted above.

In one particularly advantageous example, the treatment process is applied to a dyed polyester material and the treatment composition comprises the Fenton's reagent in a water/acetone mixture (e.g., at a weight ratio of water to acetone of about 2:1 to about 1:2), wherein the weight ratio of hydrogen peroxide to an iron salt is at least about 100:1. As used herein, reference to "decoloring," "decolorized" or "decolorization" refers to the reduction or elimination of the primary color associated with a particular colorant and refers, in particular, to degradation of the chromophore portion of a colorant molecule responsible for its color. The extent of decolorization of the synthetic polymer using the treatment process disclosed herein can be determined by visual inspection or quantified by correlating reflectance with dye concentration. Kubelka developed numerous formulas for correlating reflectance with concentration by making scattering and surface difference corrections. See, generally, Paul Kubelka, Franz Munk, Ein Beitrag zur Optik der Farbanstriche, Zeits. f. Techn. Physik 1931; 12:593-601. It has been determined that the ratio of light absorption to light scattering at a given wavelength is proportional to the concentration of the dye in the sample. The theory works best for optically thick materials. The relationship shown below is derived from the Kubelka-Munk equation.

$$K/S = \frac{(1-R)^2}{2R}$$

wherein R=1.0 at 100% reflectance, K is the absorption coefficient, and S is the scattering coefficient. Color strength is defined as:

$$\text{Color strength} = [(K/S)_{batch}/(K/S)_{standard}] \times 100.$$

Accordingly, decolorization of textile materials using the present invention can be characterized by reference to a change in K/S value, with a reduction in the K/S value indicating a reduction in dye color. In certain examples, the decolorization process of the invention can result in a K/S value of less than 3, such as less than 2.5 or less than 2.0. In certain examples, the K/S value following treatment will be less than 1.5 or less than 1.0 (e.g., from 0.1 to 1.5). The decolorization effect of the method can also be characterized as a percentage reduction of K/S value by comparing the K/S value of the untreated textile and the K/S value following treatment. In certain examples, the K/S value is reduced by the treatment process of the invention by at least 25%, but in any many advantageous examples, the percentage reduction in K/S values is at least 60%, at least 70%, at least 80%, at least 90%, or at least 95%.

The treatment process of the method is also advantageous in that the treatment accomplishes significant decolorization without significant degradation of the polymer structure of the synthetic polymer. Changes in polymer structure can be assessed by determining changes in intrinsic viscosity and viscosity average molecular weight of the decolorized textile material. In certain advantageous examples, the intrinsic viscosity, viscosity average molecular weight, and degree of polymerization (DP) of the treated textile material is substantially unchanged by the treatment process. For example, it is preferable for the intrinsic viscosity, molecular weight, and DP of the treated synthetic polymer to be within 3% (e.g., within 2% or within 1%) of the same value for the synthetic polymer prior to treatment.

The relative viscosity (RV) of a polymer can be obtained by comparing the drop time (T) of a PET solution with the drop time ($T_0$) of the pure solvent itself: $RV=T/T_0$. The intrinsic viscosity ([η]) of the material is calculated using the equation: $([\eta])=[(RV-1)\times 0.6907]+0.0631$. Degree of polymerization (DP) can be calculated by the Mark-Houwink equation: $[\eta]=KM^a$, where [η] is the polymer intrinsic viscosity and M is the viscosity average molecular weight. The parameters, a and K, depend on the particular polymer-solvent system. See, generally, Brandup, J.; Immergut, E. H. Polymer Handbook, 3rd ed.; Wiley: New York, 1989; Chapter VII: 23.

EXAMPLES

Example 1

Several experiments were conducted to determine effectiveness of decolorization using different treatment compositions and treatment temperatures. The experiments were performed on cationic dyeable polyester (PET) fabric samples. For each experiment, certain process parameters remained constant; namely, a treatment pH of 3, a L.R. of 20:1, and a treatment time of 30 minutes. Table 1 below sets forth the four factors that were modified for each experiment. Experiments were conducted using every combination of the factors of Table 1 (e.g., water only solution at both 70° C. and 120° C., both ferric sulfate concentrations at 120° C., and the like).

TABLE 1

| Factor | Low level | High level |
| --- | --- | --- |
| Solution | Water | Water:Acetone (1:1) |
| Temperature | 70° C. | 120° C. |
| Iron Catalyst (FeSO$_4$•7H$_2$O) | 1.5 g/L | 3 g/L |
| H$_2$O$_2$ (35% solution) | 14.5 g/L | 29 g/L |

For each treatment experiment, a 300 ml dyeing beaker was used and a shaking agitation was applied during the decolorization process.

The treatments using treatment compositions without ketone (i.e., no acetone) did not result in significant decolorization. For treatments in water/acetone, the higher temperature provided better decolorization. Increasing the amount of iron catalyst (FeSO$_4$.7H$_2$O) was found to reduce dye decolorization and increasing the H$_2$O$_2$ level resulted in improvement in decolorization. However, all experiments conducted with both water and acetone as the solvent system resulted in significant decolorization.

Example 2

A decolorization procedure was conducted wherein a dyed polyester (PET) fabric was first soaked in a water/acetone mixture at a L.R. ratio of 10:1 at 60° C. for 15 min, followed by adding Fenton's reagent at a concentration of 0.1 g/L and running the decolorization process at 120° C. for 30 min. The results showed that this approach provided better decolorization of a dyed PET fabric than a process wherein the water, ketone, hydrogen peroxide and iron catalyst contact the fabric at the same time.

Example 3

A decolorization treatment was applied to PET fabric samples, each dyed with one of six standard disperse dyes, which included two azo dyes (Disperse Orange 30 and Disperse Blue 79), two nitro dyes (Disperse Yellow 42 and Disperse Yellow 86), and two anthraquinone dyes (Disperse Red 60 and Disperse Blue 56). All dyes were purchased from Huntsman International LLC. Each dyed fabric sample was treated with treatment compositions using the values noted in Table 2 below.

TABLE 2

| Factor | Value |
| --- | --- |
| L.R | 10:1 |
| pH | 3 |
| Water:Acetone | 1:1 |
| Temperature | 120° C. |
| Time | 15 min |
| Catalyst (FeSO$_4$•7H$_2$O) | 0.1 g/L |
| H$_2$O$_2$ (35% w/w) | 60 g/L |

The reflectance spectra of all fabrics were measured using a Datacolor Spectraflash SF650X (Datacolor International, USA). A K/S value was calculated from the reflectance spectrum of each sample. A four-layer fabric sample was measured four times by rotating the sample at 90 degrees between each measurement. The average value was recorded. Table 3 below shows the K/S values of each PET fabric dyed by the six standard dyes—before and after decolorization. For all six dyes, the method was shown to significantly decolorize the fabric.

TABLE 3

| | K/S Before Decolorization | K/S After Decolorization |
| --- | --- | --- |
| Disperse Orange 30 | 7.862 | 2.124 |
| Disperse Blue 79 | 8.532 | 0.442 |
| Disperse Yellow 42 | 3.357 | 1.205 |
| Disperse Yellow 86 | 3.359 | 0.578 |
| Disperse Red 60 | 5.583 | 0.165 |
| Disperse Blue 56 | 4.792 | 0.225 |

Example 4

PET fabric samples (2 g each) were treated in the same manner as generally described in Examples 3 above. The relative viscosity of the PET polymer of each sample was measured using an Ubbelohde viscometer with o-chlorophenol as solvent. The resulting relative viscosity was compared to a 2 g untreated prescoured PET fabric.

For the viscosity test, all fabric samples were dissolved in 20 ml solvent at a temperature of 76.5° C. for 40 min. The solution was cooled and placed in an Ubbelohde viscometer. Using the relative viscosity measurement, the DP of each sample was calculated using the Mark-Houwink equation, wherein a=$1.7 \times 10^{-4}$ and K=0.83. The resulting IV and viscosity average MW data for all samples are set forth in Table 4 below. As noted therein, the decolorization treatment did not significantly affect the integrity of the polymer material.

TABLE 4

| Fabric Type | IV (dL/g) | MW |
| --- | --- | --- |
| Untreated | 0.5024 | 19425 |
| Treated | 0.4982 | 19203 |

The present invention provides for the following clauses, the numbering of which is not to be construed as designating levels of importance.

Clause 1: A method for decolorizing a dye-colored synthetic polymer, comprising:
 treating a dye-colored synthetic polymer with a treatment composition, the treatment composition comprising
  (a) hydrogen peroxide,
  (b) an iron-containing catalyst, (c) water, and (d) a ketone dissolved in the treatment composition;

wherein the treatment composition has a pH of 4 or less, and the treating is carried out at a temperature of at least 50° C. and for a duration of time sufficient to at least partially decolorize the synthetic polymer; and following the treating, separating at least partially decolorized synthetic polymer from the treatment composition.

Clause 2: The method of Clause 1, wherein the treatment composition comprises from 0.1M to 0.8M of the hydrogen peroxide.

Clause 3: The method of Clause 1 or 2, wherein the treatment composition comprises from 0.36 mM to 0.01 M of the iron-containing catalyst.

Clause 4: The method of any preceding Clause, wherein the iron-containing catalyst comprises an iron salt which at least partially dissolves in the treatment composition, thereby providing iron (II) ions or iron (III) ions to the treatment composition.

Clause 5: The method of any preceding Clause, wherein the iron-containing catalyst comprises iron (II) sulfate.

Clause 6: The method of any preceding Clause, wherein the iron-containing catalyst consists essentially of iron (II) sulfate.

Clause 7: The method of any preceding Clause, wherein a weight ratio of the hydrogen peroxide to the iron-containing catalyst present in the treatment composition is at least 100:1.

Clause 8: The method of any preceding Clause, wherein the ketone comprises a ketone selected from the group consisting of acetone, methyl ethyl ketone, 2-pentanone, 3-pentanone, 2-hexanone, 3-hexanone, methyl isobutyl ketone, methyl n-propyl ketone, methyl isopropyl ketone, ethyl ketone, and any combination thereof.

Clause 9: The method of any preceding Clause, wherein the ketone comprises acetone.

Clause 10: The method of any preceding Clause, wherein the ketone consists essentially of acetone.

Clause 11: The method of any previous Clause, wherein a weight ratio of the water to the ketone in the treatment composition is from 4:1 to 1:4.

Clause 12: The method of Clause 1, wherein the treating is carried out at a temperature of at least 70° C.

Clause 13: The method of any preceding Clause, wherein a liquor ratio present during the treating step is at least 10:1.

Clause 14: The method of any preceding Clause, wherein the dye-colored synthetic polymer is colored with a dye selected from the group consisting of acid dyes, basic dyes, mordant dyes, direct dyes, sulfur dyes, disperse dyes, reactive dyes, and vat dyes.

Clause 15: The method of any preceding Clause, wherein the dye-colored synthetic polymer is colored with a dye selected from the group consisting of acridine dyes, anthraquinone dyes, arylmethane dyes, azo dyes, cyanine dyes, nitro dyes, nitroso dyes, phthalocyanine dyes, quinone dyes, thiazine dyes, thiazole dyes, xanthene dyes, fluorene dyes, stilbene dyes, vinyl sulfone dyes, triazine dyes, sulfur dyes, indigoid dyes, and any combination thereof.

Clause 16: The method of any preceding Clause, wherein the dye-colored synthetic polymer material is colored with an azo dye, an anthraquinone dye, or any combination thereof.

Clause 17: The method of any preceding Clause, wherein the synthetic polymer comprises a polymer selected from the group consisting of regenerated celluloses, polyesters, polyamides, polyurethanes, polyolefins, acrylonitriles, and any combination thereof.

Clause 18: The method of any preceding Clause, wherein the synthetic polymer comprises polyethylene terephthalate (PET).

Clause 19: The method of any preceding Clause, wherein the synthetic polymer consists essentially of polyethylene terephthalate (PET).

Clause 20: The method of any preceding Clause, wherein the dye-colored synthetic polymer is present in the form of a dye-colored synthetic polymer textile.

Clause 21: The method of any preceding Clause, wherein following the treating, the decolorized synthetic polymer textile has a K/S value of less than 3, as determined using equation (i):

$$K/S = \frac{(1-R)^2}{2R} \qquad (i)$$

wherein R=1.0 at 100% reflectance.

Clause 22: The method of any preceding Clause, wherein following the treating, the decolorized synthetic polymer textile has a K/S value as determined using equation (i) which is at least 70% lower than the K/S value of the dye-colored synthetic polymer prior to the treating $$K/S = \frac{(1-R)^2}{2R} \qquad (i)$$

wherein R=1.0 at 100% reflectance.

Clause 23: The method of any preceding Clause, wherein a difference between an intrinsic viscosity of the synthetic polymer before and after the treating is less than plus or minus 5%.

Clause 24: The method of any preceding Clause, further comprising a step of pre-soaking the dye-colored synthetic polymer prior to the treating, wherein the pre-soak composition comprises an aqueous solution of an organic solvent.

Clause 25: The method of Clause 24, wherein the organic solvent of the pre-soak composition comprises a ketone.

Clause 26: The method of Clause 25, wherein the organic solvent of the pre-soak composition comprises the same ketone as the treatment composition.

Clause 27: A method for decolorizing a dye-colored polyethylene terephthalate-containing textile, comprising:

optionally pre-soaking a dye-colored polyethylene terephthalate-containing textile in a presoak composition comprising water and acetone;

treating the dye-colored textile with a treatment composition, the treatment composition comprising (a) from 0.1M to 0.8M hydrogen peroxide, (b) 0.36 mM to 0.01 M of iron (II) ions, (c) water, and (d) acetone;

wherein the treatment composition has a pH of 4 or less, and the treating is carried out at a temperature of at least 70° C. and for a duration of time sufficient to at least partially decolorize the dye-colored textile; and following the treating, separating at least partially decolorized textile from the treatment composition.

Many modifications and other clauses of the disclosure will come to mind to one skilled in the art to which this disclosure pertains having the benefit of the teachings presented in the foregoing descriptions. Therefore, it is to be understood that the disclosure is not to be limited to the specific clauses disclosed herein and that modifications and other clauses are intended to be included within the scope of the appended claims. Although specific terms are employed herein, they are used in a generic and descriptive sense only and not for purposes of limitation. The invention includes any combination of two, three, four, or more of the above-noted clauses as well as combinations of any two, three, four, or more features or elements set forth in this disclosure, regardless of whether such features or elements are expressly combined in a specific clause description herein. This disclosure is intended to be read holistically such that any separable features or elements of the disclosed invention, in any of its various aspects and clauses, should be viewed as intended to be combinable unless the context clearly dictates otherwise.

What is claimed is:

1. A method for decolorizing a disperse dye-colored polyethylene terephthalate fabric wherein the dye is an azo dye, a nitro dye, an anthraquinone dye, or any combination thereof, the method, comprising:
    treating the disperse dye-colored polyethylene terephthalate fabric with a treatment composition, the treatment composition comprising
    (a) from 0.1M to 0.8M hydrogen peroxide,
    (b) from 0.36 mM to 0.01 M of iron (II) ions,
    (c) water, and
    (d) acetone dissolved in the treatment composition, wherein a weight ratio of the water to the acetone in the treatment composition is about 1:1; wherein the treatment composition has a pH of 3, and the treating is carried out at a temperature of from 70° C. to 120° C., and for a duration of time sufficient to at least partially decolorize the polyethylene terephthalate fabric; and
    following the treating, separating at least partially decolorized polyethylene terephthalate fabric from the treatment composition.

2. The method of claim 1, wherein a weight ratio of the hydrogen peroxide to the iron(II) ions present in the treatment composition is at least 100:1.

3. The method of claim 1, wherein a liquor ratio present during the treating step is at least 10:1.

4. The method of claim 1, wherein following the treating, the decolorized polyethylene terephthalate fabric has a K/S value of less than 3, as determined using equation (i):

$$K/S = \frac{(1-R)^2}{2R} \quad \text{(i)}$$

wherein R=1.0 at 100% reflectance.

5. The method of claim 1, wherein following the treating, the decolorized polyethylene terephthalate fabric has a K/S value as determined using equation (i) which is at least 70% lower than the K/S value of the dye-colored polyethylene terephthalate fabric prior to the treating $$K/S = \frac{(1-R)^2}{2R} \quad \text{(i)}$$

wherein R=1.0 at 100% reflectance.

6. The method of claim 1, wherein a difference between an intrinsic viscosity of the polyethylene terephthalate fabric before and after the treating is less than plus or minus 5%.

7. The method of claim 1, further comprising a step of pre-soaking the dye-colored polyethylene terephthalate fabric prior to the treating, wherein the pre-soak composition comprises an aqueous solution of acetone.

* * * * *